March 25, 1958 C. C. MANCHESTER 2,827,916
FLOAT VALVE
Filed Nov. 14, 1955 3 Sheets-Sheet 1
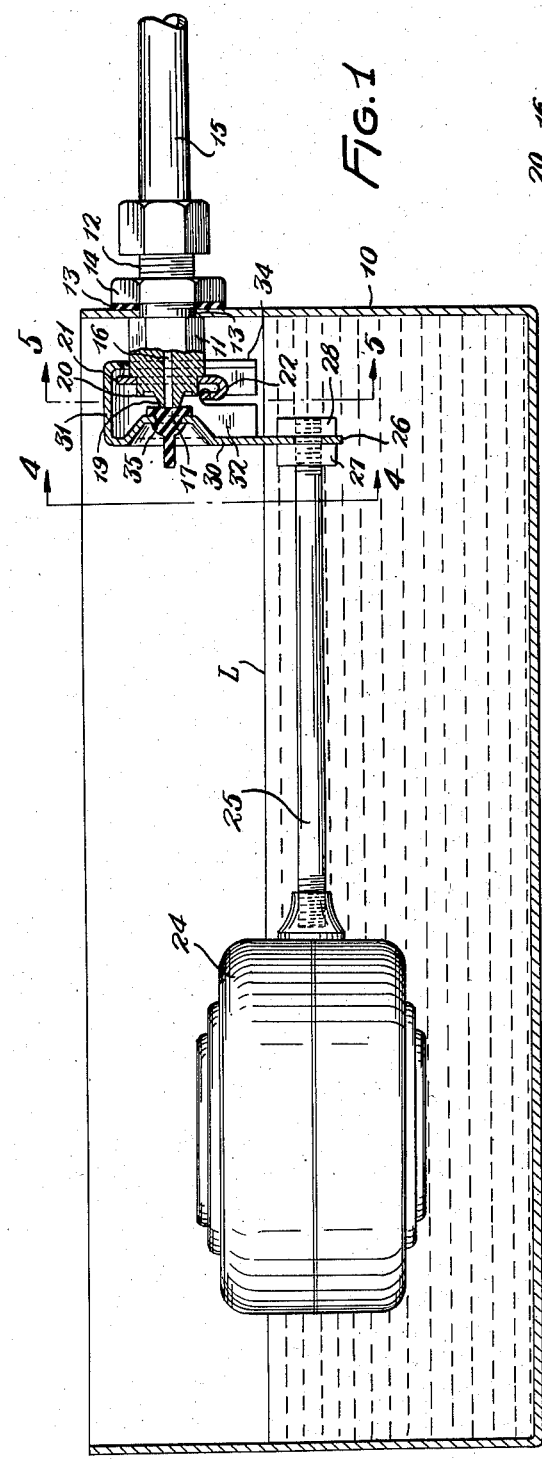
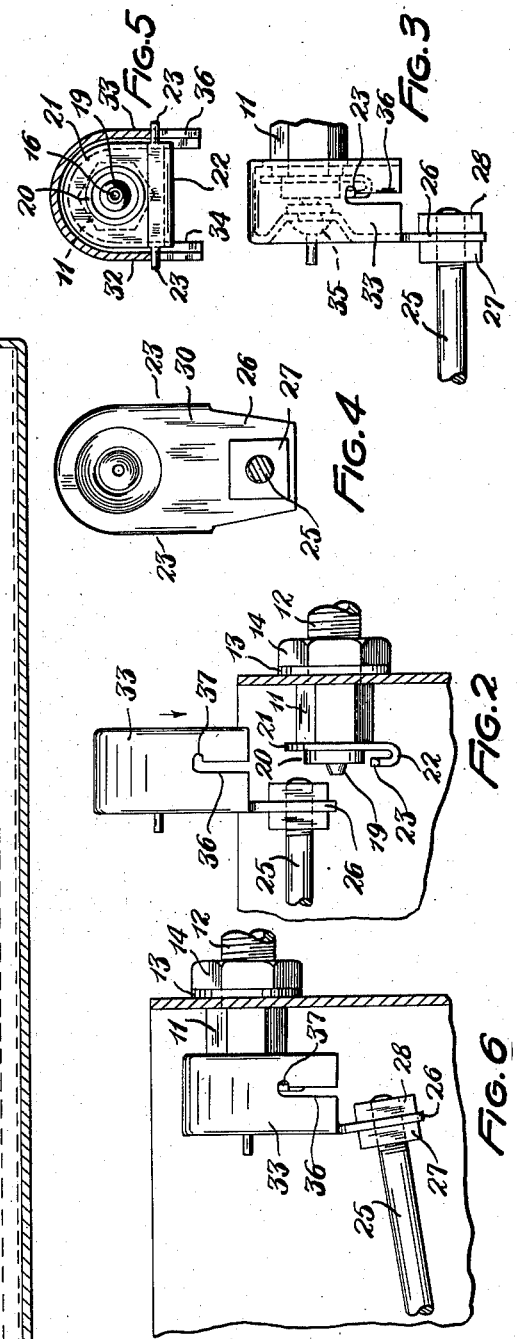
INVENTOR.
CLYDE C. MANCHESTER
BY Hudson, Broughton,
Williams, David & Hoffmann
ATTORNEYS March 25, 1958 — C. C. MANCHESTER — 2,827,916
FLOAT VALVE Filed Nov. 14, 1955 — 3 Sheets-Sheet 2

INVENTOR.
CLYDE C. MANCHESTER
BY Hudson, Boughton,
Williams, David & Hoffmann
ATTORNEYS March 25, 1958  C. C. MANCHESTER  2,827,916
FLOAT VALVE
Filed Nov. 14, 1955  3 Sheets-Sheet 3

INVENTOR.
CLYDE C. MANCHESTER
BY Hudson, Broughton,
Williams, David & Hoffmann
ATTORNEYS

United States Patent Office 2,827,916
Patented Mar. 25, 1958

2,827,916

FLOAT VALVE

Clyde C. Manchester, Toledo, Ohio

Application November 14, 1955, Serial No. 546,518

9 Claims. (Cl. 137—437)

This invention relates to improvements in float valves, that is to say devices of the type in which a valve is opened or closed by the down and up movements of a float in a body of liquid as the level thereof changes. The invention has varied uses, amongst which are the feeding of water into the humidifier of a warm air furnace and the maintenance of a constant water level in a water trough for farm stock or poultry.

This application is a continuation-in-part of my copending application Serial No. 478,773 filed December 30, 1954, now abandoned.

One of the objects of the invention is the provision of a float controlled valve which has a minimum number of parts and which minimizes friction by utilizing a single pivotal connection.

Another object is the provision of a float controlled valve which may be disassembled without tools of any kind, thereby exposing the liquid passage for cleaning, by lifting off the movable part of the device from the fixed part thereof.

Another object is the provision of a float controlled valve having a fixed valve body and a movable float, lever and hood assembly, the hood having downwardly opening slots in the side walls receiving trunnions on the valve body, whereby the movable part may be disconnected from the fixed part without the use of tools.

Another object is the provision of means for preventing the accidental disconnection of the movable part of the device.

Another object is the provision of means for preventing such accidental disconnection, comprising lateral cavities at the upper ends of the slots for the reception of the trunnions so as to oppose upward movement of the hood.

A further object is the provision of means tending to retain the movable part of the device in operative position at all times when water pressure is available, but wherein slight pressure by the operator in opposition to the water pressure makes the movable part of the valve readily separable from the fixed part.

Another object is the provision of spring means for completing the bearings of said trunnions while they are in said cavities, thereby providing accurate centering of the trunnions and precision operation of the valve, while permitting quick and easy disconnection and access to the liquid passage for cleaning.

Another object is the provision of means for utilizing the float valve as a shutoff valve.

Other objects and features of novelty will appear as I proceed with the description of those embodiments of the invention which, for the purposes of the present application, I have illustrated in the accompanying drawings, in which:

Fig. 1 is a general elevational view of the valve complete with its float, the view being partly in vertical section and showing the valve in closed position;

Fig. 2 is a fragmental elevational view showing the two main parts of the valve separated in order to permit inspection and cleaning of the water passage;

Fig. 3 is a fragmental elevational view of the valve in operative condition;

Fig. 4 is a view taken substantially on the line 4—4 of Fig. 1, showing the front of the hood in elevation;

Fig. 5 is a transverse detail section taken substantially on the line 5—5 of Fig. 1;

Fig. 6 is a fragmental elevational view showing a depending hood extension adjusted to make the valve close at a lower elevation of liquid than in Fig. 1;

Figure 7:
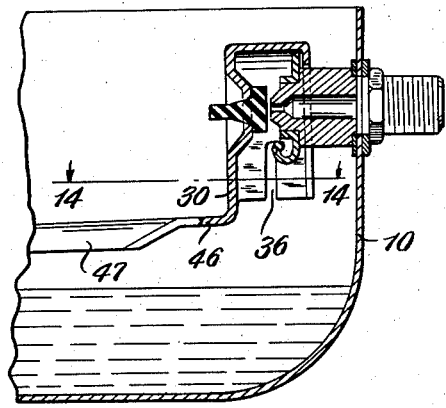
Fig. 7 is a fragmental view similar to Fig. 1, showing a modified form of lever and illustrating the valve in open position.

In the drawing a liquid container is shown at 10. The device seeks to maintain the liquid in the container at a certain selected level indicated at L. The valve comprises a fixed assembly and a movable assembly. The fixed assembly comprises a valve body 11 which may be hexagonal in order to facilitate its being held against turning by a wrench. It comprises also a hollow exteriorly threaded shank 12. A hole 13 is drilled through a side wall of the container 10 and the shank 12 is projected therethrough from the inside of the container until the shoulder at the end of the hex engages the inner surface of the container wall. A washer 13 and nut 14 are then placed in position on the shank and the nut threaded down to hold the valve body securely in fixed position.

A tube 15 constituting a pipe of a water system may then be secured to the shank 12 by known means. The forward end of the valve body is drilled to provide a central passage 16 of relatively small diameter, the forward end of which constitutes a port in a projection 19 of truncated cone form. The forward end of the hex 11 is turned down to provide a cylindrical head 20 over which is pressed a sheet metal plate 21 which functions partially as a baffle. The lower part of this plate is turned up across its width to form an end portion 22 that is U-shaped in cross section, and the lateral extremities of the U-shaped portion have reduced outwardly directed extensions 23 constituting trunnions. These trunnions constitute pintle means which may be formed in any other suitable manner. This completes the fixed assembly part of the device.

The movable assembly comprises a float 24 of any suitable form and material secured to one end of a lever which in Fig. 1 is illustrated as rod 25. The opposite end of rod 25 extends through an opening in a depending extension 26 of a sheet metal hood and is threaded to receive nuts 27 and 28 by means of which a rigid connection is made between the rod and the hood.

The hood consists of a single sheet metal stamping which comprises a front wall 30, a top wall 31, two side walls 32 and 33 and a rear flange 34 of inverted U-shape. One of the functions of the hood of course is to guide water downwardly and to prevent it from being spattered about when the valve is open, the baffle plate 21 assisting in accomplishing this result. The forward face 30 of the hood is offset at one point inwardly or rearwardly, as best illustrated in Fig. 1, and perforated to receive a plug 35, preferably of soft rubber, which is provided with an annular groove to receive the wall around the perforation and hold the plug against accidental dislocation. The rear face of the plug constitutes a pad 17 which forms a resilient valve piece opposite the frustoconical head of the valve body and is adapted to close the port at the forward end of passage 16.

In each of the side walls 32 and 33 of the hood there are oppositely disposed slots 36 of identical length. They are dimensioned to receive loosely the trunnions 23. At the upper ends of these slots there are rearwardly extending shallow cavities 37. The upper ends of the slots 36 and the cavities 37 rest pivotally upon the trunnions 23, providing a small amount of possible movement of the hood forwardly and rearwardly with respect to the fixed assembly.

The effective height of the float can be varied for the purpose of changing the water level, and this can be done without the use of tools by bending the depending extension 26 of the front wall 30 of the hood. As shown in Fig. 6 the extension 26 may be bent to lower the float with the result that the device will maintain a comparatively low level of liquid in the container 10. If the extension 26 is bent upwardly instead of downwardly the resulting level of liquid will be raised.

When the water reaches a predetermined level, controlled by the position of extension 26, the hood is tilted on the trunnions 23 until the pad 17 closes the port at the forward end of passage 16. Assuming a fairly strong liquid pressure in passage 16, the pad 17 will tend to move away from the port, but it can do so only in a rocking motion around the trunnions 23, and the parts are so proportioned that when the trunnions are received in the cavities 37 the pad 17 will seat firmly and smoothly against the conical projection 19 of the valve body. When the trunnions are in the cavities, as during normal operation, the head cannot be accidentally lifted. To lift it the operator must first push the hood rearwardly to bring the trunnions out of the cavities into the slots 36. This rearward motion of the hood by the operator is made possible in either of two ways. First, the operator may depress the float slightly against its natural buoyancy, which will cause the slots to swing rearwardly around the contacting faces of the pad 17 and the projection 19, or he may push the hood rearwardly in a straight horizontal direction, the pad 17 because of its soft characteristic yielding to permit that motion.

When, because of an obstruction in the water line, the container 10 fails to fill again after the water level is lowered, the operator lifts the movable assembly off the fixed assembly and inserts a wire or the like into the passage 16 to clear it, after which he again hangs the movable assembly onto the fixed assembly, an extremely simple operation contrasting markedly with other systems in which screws or nuts must be removed before the device can be taken apart and the valve cleaned out, the screws or nuts being replaced thereafter in again assembling the valve for use.

Figure 8:
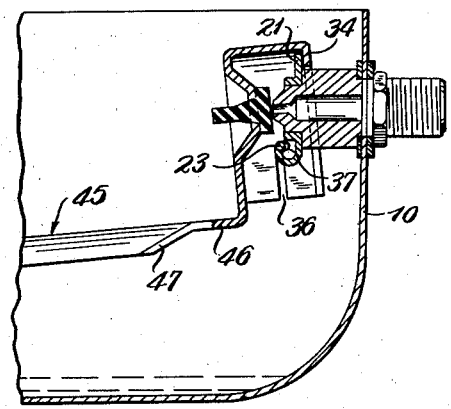
Fig. 8 is a view similar to that of Fig. 7 showing the lever in a position which it might assume if there were no liquid in the tank, and if no means were provided to keep the cavities in engagement with the trunnions.
Figure 14:
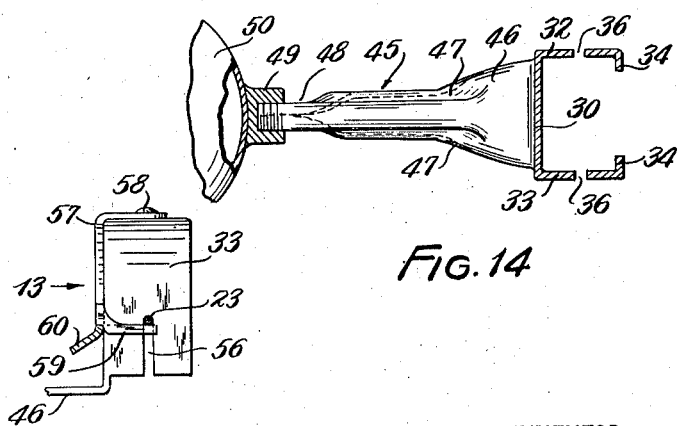
Fig. 14 is a horizontal section taken on the line 14—14 of Fig. 7, showing a form of float lever integral with the hood.

In Figs. 7 and 8 the parts are like those of Fig. 1 except as to the lever 45 which in this case is integral with the hood. The front wall 30 of the hood is bent cut laterally in a flat portion 46; see Fig. 14. The edges are then bent inwardly and downwardly as indicated at 47 so as to merge gradually with the left hand end which is curved into tubular form as indicated at 48, the extremity being threaded for insertion into a nipple 49 on the float shown fragmentally at 50.

Fig. 7 shows the valve open, the liquid being below the desired level.

The valve structures shown in Figs. 1 and 7 will function satisfactorily under normal conditions, that it while the liquid level varies between maximum and a minimum high enough to support the float above the bottom of the tank. However, if after some very rapid consumption of liquid the float should rest upon the bottom of the tank, a condition may be encountered like that illustrated in Fig. 8 wherein the trunnions move relatively forward out of the cavities 37 and the upper edge of the flange 34 contacts the upper end of the baffle plate 21. The hood then ceases to be centered about an axis through the cavities 37 as it should be, and the valve instead of being fully opened as it should be in order to cause liquid to fill the tank is partially closed.

Figures 9, 10:
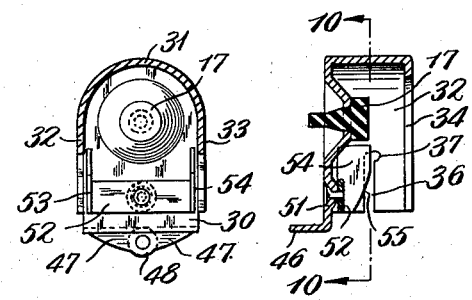
Fig. 9 is a sectional view of a hood provided with yieldable spring means to complete accurate bearings for the trunnions.
Fig. 10 is a transverse sectional view taken substantially on the line 10—10 of Fig. 9.

In my improved construction this difficulty is overcome by the use of a spring means for retaining the trunnions in the cavities 37. Referring especially to Figs. 9 and 10, it will be observed that a rearwardly extending boss 51 is formed in the front wall 30 of the hood near the middle lower part of the latter. On the rear side of this boss a spring metal strap 52 is riveted or otherwise secured. This strap extends laterally in both directions nearly to the side walls 32 and 33, where it merges with integral upwardly extending wings 53 and 54, the rear edges of which are formed as cams 55. These cams partially overlie the slots 36 as shown in Fig. 9.

The spring means 52, 53, 54 is cammed over and yields when the hood is lowered onto the trunnions 23 until the cavities 37 receive the trunnions, when the wings 53 move rearwardly and releasably hold the trunnions in the cavities.

The shoulders on the lower sides of the cavities 37 tend to prevent the hood from being lifted off the trunnions 23 accidentally, as for instance because of movements of stock or poultry. The force of the water or other liquid acting against the valve seat 17 normally exerts sufficient pressure to impel the hood forward and thus cause the cavities 37 to receive and hold the trunnions. The cam edges 55 on the wings 53 and 54 serve as detents or additional means to hold the cavities 37 in contact with the trunnions. However the primary purpose of the spring means 52, 53, 54 is to maintain an accurate pivotal axis for the hood, the wings 53 and 54 constituting bearing means for the forward sides of the trunnions.

Figure 11:
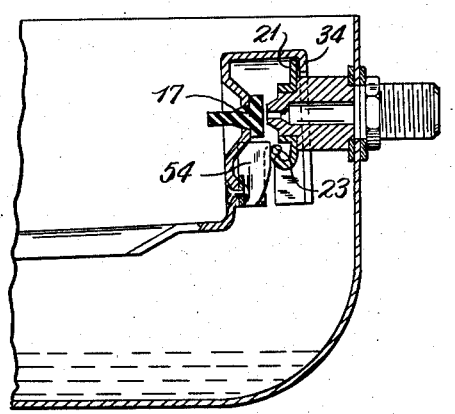
Fig. 11 is a view similar to Fig. 8 but showing the hood equipped with the spring means of Figs. 9 and 10 to keep the cavities and the trunnions accurately centered.

The advantage of the spring means will be apparent by a comparison of Figs. 8 and 11. In both of these figures the trough 10 is empty or at least the liquid level is so low that it affords no buoyancy for the float. In Fig. 8, lacking the spring means, the hood is rocked down, the pivot point being changed from the axis through cavities 37 below the valve to the point of contact between plate 21 and flange 34 above the valve. This tends to close the valve at a time when it should be open. With the parts in the positions of Fig. 8, liquid can pass through the valve only very slowly if at all. In Fig. 11 on the other hand, where the spring means is included, the pivot point remains where it should be, that is on the axis of the cavities 37, and the valve remains open even if the weight of the float and lever are sufficient to cause the flange 34 to contact the plate 21. In this way all contingencies are met, that is the valve functions properly under every condition of service.

Figures 12, 13:
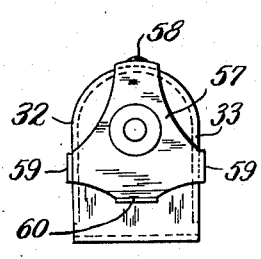
Fig. 12 is an elevational side view of a modified form of hood in which there are no lateral cavities at the upper ends of the slots.
Fig. 13 is an elevational view looking in the direction of arrow 13 of Fig. 12.

In Figs. 12 and 13 a somewhat different modification is shown in which there are two slots 56 in the sides of the hood similar to the slots 36 except that there are no lateral cavities at the upper ends of slots 56, the width of the slots being just sufficient to clear the trunnions 23 and provide accurate bearings for the hood. To prevent the hood from being accidentally lifted off the trunnions I provide, a detent in the form of an external double spring latch 57 riveted or otherwise secured to the top of the hood at 58 and having rearwardly extending arms 59 adapted to engage beneath both of the trunnions 23. This spring means is biased to remain in the Fig. 12 position. When, however, it is desired to disengage the hood, as for the purpose of cleaning out the liquid passage through the valve body, the operator by placing a finger under a projection 60 on the latch may lift the latch and withdraw the arms 59 momentarily, at the same time raising the hood off the trunnions.

It is frequently desirable in some types of apparatus to shut off the flow of liquid while the trough or other container to which liquid is to be fed is cleaned, changed or otherwise serviced. Means for accomplishing this purpose is illustrated in Figs. 15 to 18 inclusive.

In the illustrated case there is a fixed valve body 65 having a hexagonal portion 66 adapted to receive a wrench. In assembling the valve the body 65 is inserted through a hole in tank 10 and locked in place by a nut 67 mounted upon the exteriorly threaded portion of the valve body.

Integral with the valve body 65 there is a forwardly projecting spindle 68 through which extends the liquid passage 16 terminating in the projection 19, the forward extremity of the passage constituting the port of the valve. Surrounding this spindle there is a sleeve 69 which is freely rotatable upon the spindle. It has a flange 70 at its rear end, which flange is cut away at two diametrically opposed points 71. A plate 72 of spring metal has a central circular opening to loosely receive the sleeve 69. This plate is held against rotation by slots 73 engaging headed pins 74 that are driven into drilled openings in the valve body 65. The plate 72 has two small bosses 75 formed therein in a line at right angles to a line connecting slots 73, which bosses extend rearwardly from the plate in such manner as to engage in the openings 71 when the sleeve is rotated to the proper angular position.

Figure 16:
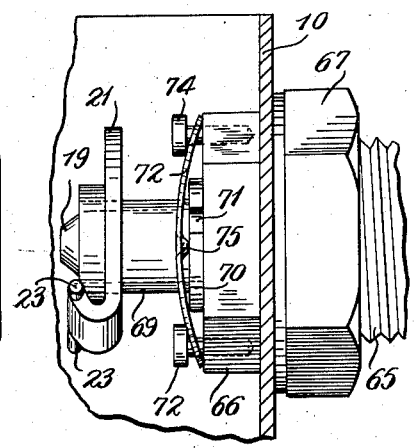
Fig. 16 is an elevational view of the valve body and associated parts illustrating an intermediate position occurring during the turning of the valve to shutoff position.

The heads of pins 74 hold the plate 72 against movement lengthwise of spindle 68 and the plate in turn by engagement with the flange 70 holds the sleeve against lengthwise movement. However, when the sleeve is turned the plate 72 is deformed as indicated in Fig. 16, the bosses 75 with their rounded surfaces riding out of the openings 71 onto the surface of flange 70, the slots 73 permitting this bending of the plate. After the sleeve 69 and the plate 72 are mounted as just described, the sheet metal plate 21 is mounted on the sleeve 69 with a press fit, so that the parts 69 and 21 are held against relative rotation.

Figure 15:
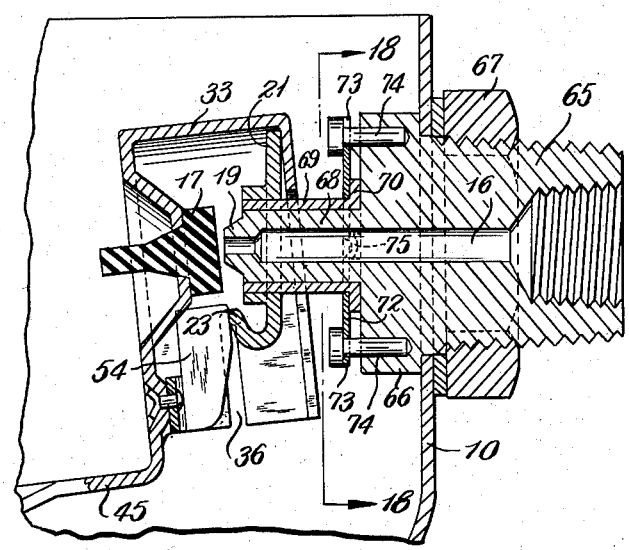
Fig. 15 is a vertical sectional view on a larger scale showing a modification in which provision is included for utilizing the valve as a shutoff valve, the parts being illustrated in normal operating position with the valve open.

The normal or operating position of the valve is illustrated in Fig. 15, the valve being shown open in that figure. When the liquid in the tank 10 reaches the predetermined desired level the lever 45 swings up and presses the resilient pad 17 against the seat formed by the projection 19, thus closing the valve.

Figure 17:
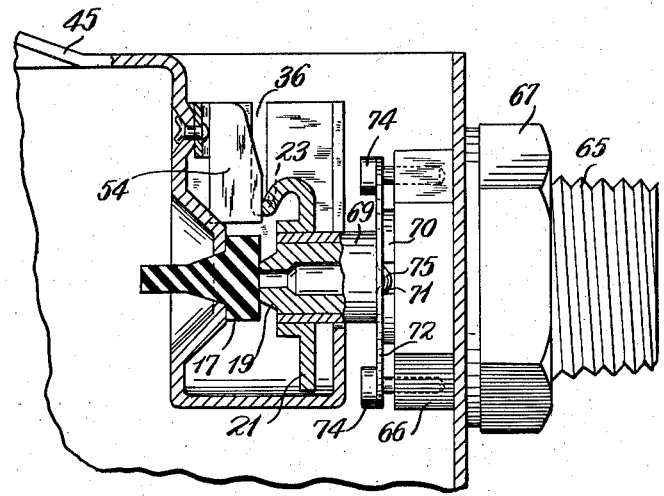
Fig. 17 is a view similar to Fig. 15 showing the parts turned through 180° to valve shutoff position.
Figure 18:
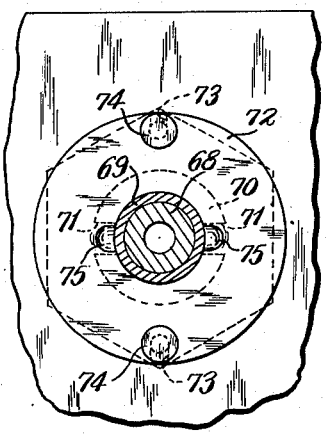
Fig. 18 is a detail view partly in section on the line 18—18 of Fig. 15.

Should it be desired to clean out the tank 10 or any other container disposed beneath the valve, the operator merely grasps the hood 33 or the lever 45 and by its engagement with the pintles 23 turns the plate 21 and the sleeve 69 through an angle of 180° to the position of Fig. 17, where the weight of the lever and the float carried thereby moves the valve piece 17 about the pintles 23 causing the pad or valve piece 17 to press against the ported projection 19, thereby shutting off liquid flow. The engagement of bosses 75 in plate 72 and the openings 71 in flange 70 functions to yieldably hold the parts against rotation in the shutoff position as well as in the normal operating position. The plate 72 readily yields to permit rotation from either one of these positions to the other.

Having thus described my invention, I claim:

1. In a device of the class described, a liquid container and means supplying liquid thereto and maintaining a substantially constant level therein, comprising a fixed valve body having a liquid passage therethrough terminating in a port, a transverse plate in the body projecting upwardly and laterally from the adjacent portions of the body to form a stop and baffle to the rear of the port, a float in the container, a lever attached to said float, said lever carrying a hood open at the bottom having top, front and sides enclosing said valve body and having an inwardly directed rear flange enclosing said baffle, a valve piece mounted in the front wall of said hood and closing said port when said float is in the raised position, said valve body having a pair of aligned outwardly extending trunnions disposed below said passage and port, said hood having a pair of downwardly opening slots in the sides thereof fitting over said trunnions, whereby the float, lever and hood assembly are pivotally supported at aligned points laterally separated from said body and whereby the valve may be disassembled and the liquid passage exposed for cleaning by lifting the float, lever and hood assembly off said trunnions.

2. A device substantially as defined in claim 1, comprising detent means carried by the hood for opposing accidental upward movement of said hood.

3. A device substantially as defined in claim 2, including means for opposing accidental upward movement of the hood comprising a rearwardly extending cavity at the upper end of each slot, within which cavities said trunnions are received when the device is in use and water pressure is present in said liquid passage.

4. A device substantially as defined in claim 3, wherein said means for opposing accidental upward movement of the hood comprises also spring means carried by the hood yieldably opposing forward movement of the hood relative to said trunnions.

5. In a device of the class described, a fixed valve body having a liquid passage therethrough terminating in a port, a valve seat surrounding said port, a lever, a float attached thereto, a transverse pivotal mounting for said lever normally disposed below said port, said pivotal mounting being rotatable about an axis coincident with the axis of said passage to dispose the pivotal mounting above said port, a valve piece carried by said lever adapted to contact said seat and close said port when said pivotal mounting is below said port and said lever is raised by buoyancy imparted to the float, or when said mounting is above said port and the weight of said lever and float becomes effective to swing the valve piece downwardly against its seat.

6. A device substantially as defined in claim 5, wherein said fixed body comprises a horizontal spindle containing said liquid passage, a sleeve mounted for rotation upon said spindle, the pivotal means for said lever being carried by said sleeve radially spaced from said passage, and means for releasably holding said sleeve in either of two positions 180° apart.

7. A device substantially as defined in claim 6, wherein the means for releasably holding the sleeve in either of two positions comprises a flange on the sleeve, a spring plate loosely surrounding the sleeve, fastenings carried by the valve body holding said plate against rotation and against bodily movement axially of said spindle but permitting bending of the plate, and detent means in said plate and flange for releasably holding said flange against rotation in either of said positions 180° apart.

8. A device substantially as defined in claim 7, wherein said detent means comprises a pair of diametrically opposed bosses formed in the spring plate adapted to take into diametrically opposed cavities formed in the flange of the sleeve, said plate having diametrically opposed slots extending inwardly from its periphery in a line at right angles to the line through said bosses, and said fastenings consisting of headed pins driven into said body at points radially outward of said spindle projecting through said slots.

9. A device as defined in claim 2, wherein said detent means comprises a spring externally disposed on the front of the hood having portions extending rearwardly into engagement with said trunnions.

References Cited in the file of this patent

UNITED STATES PATENTS

| 2,722,231 | Hansen | Nov. 1, 1955 |
| 2,766,770 | Dickinson | Oct. 16, 1956 |

FOREIGN PATENTS

| 67,885 | Denmark | Oct. 18, 1948 |
| 734,151 | Great Britain | July 27, 1955 |